Figure 1:
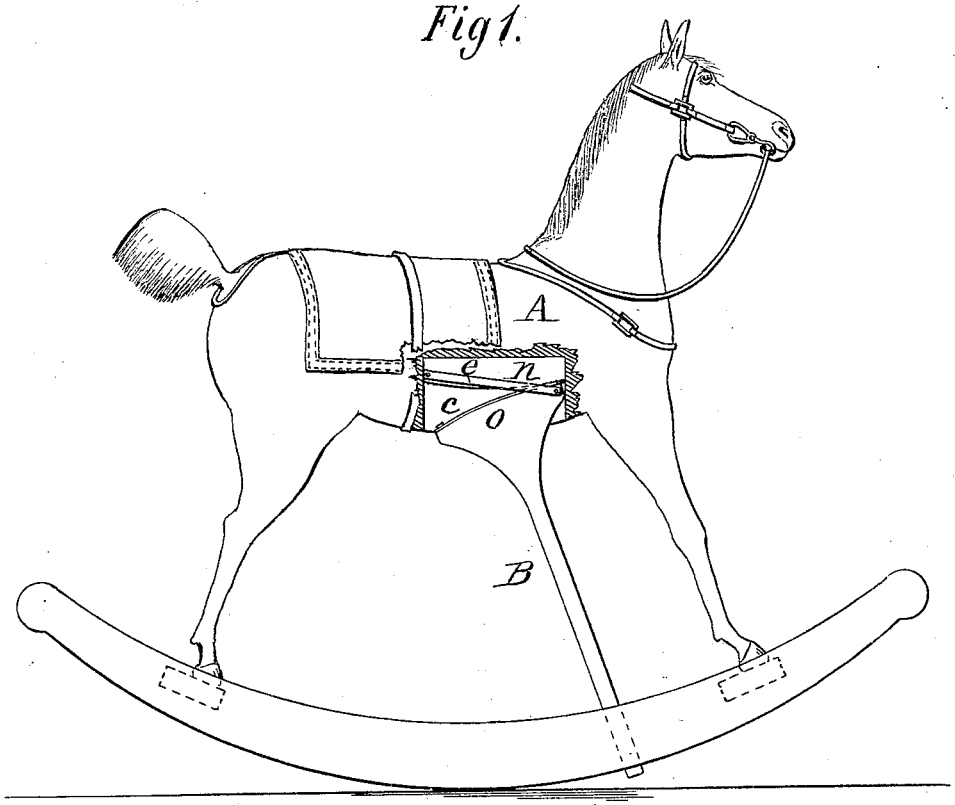
Figure 2:
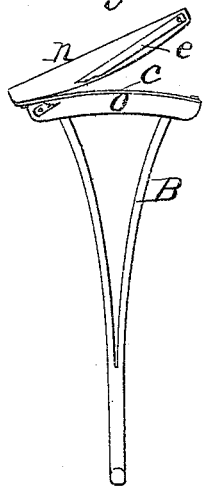
Figure 3:
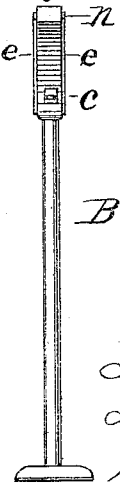
Figure 1:
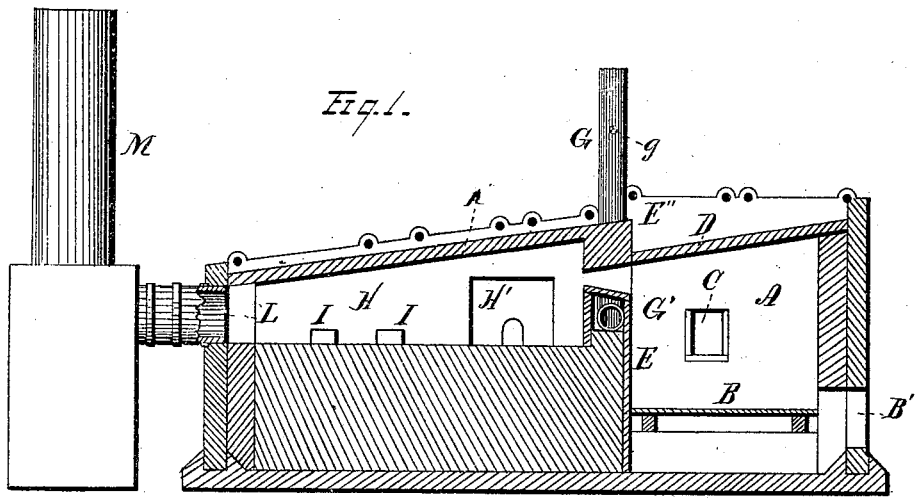
Figure 2:
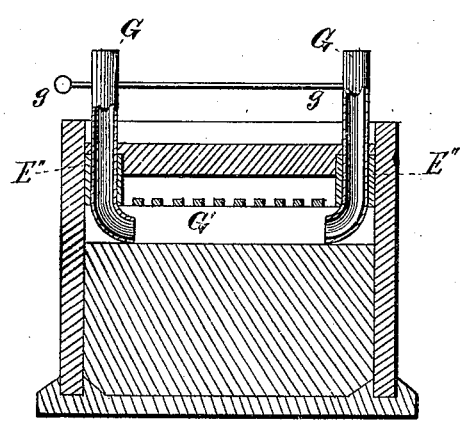

L. ANDERSON & L. FOSS.
Hobby-Horses.

No. 150,121.  Patented April 28, 1874.

Witnesses.  Inventor.

J. M. AYER.
Furnaces for Heating and Puddling Iron and Steel.
No. 150,122. Patented April 28, 1874.

WITNESSES. INVENTOR
John M. Ayer
By Leggett & Leggett
Attorneys.